United States Patent
Lepley et al.

(10) Patent No.: US 8,051,702 B2
(45) Date of Patent: Nov. 8, 2011

(54) VIBRATION MONITOR

(75) Inventors: Joseph M. Lepley, Girard, OH (US); Richard D. Yohman, Canfield, OH (US); Thomas C. Wick, Hubbard, OH (US)

(73) Assignee: Altronic, Inc., Girard, OH (US)

( * ) Notice: Subject to any disclaimer, the term of this patent is extended or adjusted under 35 U.S.C. 154(b) by 443 days.

(21) Appl. No.: 12/269,325

(22) Filed: Nov. 12, 2008

(65) Prior Publication Data

US 2010/0116028 A1    May 13, 2010

(51) Int. Cl.
*G01M 15/12*    (2006.01)
(52) U.S. Cl. .................................. 73/35.03; 73/114.07
(58) Field of Classification Search ............. 73/35.03, 73/35.04, 35.07, 35.11, 117.3; 123/406.16, 123/406.34
See application file for complete search history.

(56) References Cited

U.S. PATENT DOCUMENTS

| | | | |
|---|---|---|---|
| 3,393,557 A | 7/1968 | Brown et al. | |
| 4,153,020 A * | 5/1979 | King et al. | 123/406.39 |
| 4,463,610 A | 8/1984 | Anderson, III et al. | |
| 4,475,401 A * | 10/1984 | Punia et al. | 73/658 |
| 4,565,087 A | 1/1986 | Damson et al. | |
| 4,793,310 A | 12/1988 | Komurasaki | |
| 5,284,047 A | 2/1994 | Brokaw | |
| 5,373,726 A | 12/1994 | Brinks et al. | |
| 5,392,642 A * | 2/1995 | Tao | 73/114.13 |
| 5,679,900 A * | 10/1997 | Smulders | 73/659 |
| 6,988,483 B1 | 1/2006 | Hagari | |

OTHER PUBLICATIONS

Texas Instrument: "TPIC8101 Knock Sensor Interface", XP-002577830, May 2005, pp. 1-20, Dallas, Texas.
Robert Bosch, "Piezoelectric Vibration Sensors", Model 0 261 231 148, pp. 22-23.
Burr-Brown, "Precision, Low Power Instrumentation Amplifier", INA118, 1994.
Semiconductor Components Industries, LLC, "Quad Analog Switch/Quad Multiplexer", MC14066B, Feb. 2005-Rev. 5.

* cited by examiner

*Primary Examiner* — Helen C. Kwok
(74) *Attorney, Agent, or Firm* — The Webb Law Firm

(57) ABSTRACT

A system comprising an amplifier for amplifying signals of frequencies less than one kilohertz generated by a vibration sensor and using the amplified signal to amplitude modulate a carrier signal at a frequency in excess of one kilohertz and applying the amplitude modulated carrier signal to a sensor interface circuit.

3 Claims, 1 Drawing Sheet

VIBRATION MONITOR

BACKGROUND OF THE INVENTION

1. Field of the Invention

This invention relates to vibration sensing equipment to monitor the operating conditions of mechanical assemblies.

2. Description of Related Art

This invention relates specifically to the use of an inexpensive type of sensor and the low cost conditioning electronics developed exclusively for use with it. These products are normally used on automobile engines to sense a particular type of vibration normally referred to as engine detonation. The invention described herein makes use of the same low cost components specifically developed for the automotive mass market and applies them to general vibration monitoring on industrial equipment, especially stationary engines and their driven loads and accessories.

SUMMARY OF THE INVENTION

Briefly, according to one embodiment of this invention, there is provided a system comprising a vibration sensor and sensor interface previously developed for sensing detonations at frequencies greater than one kilohertz on automobile engines for the measurement of mechanical vibration of a much lower frequency on industrial equipment. The system further comprises an amplifier for amplifying signals of frequency less than one kilohertz generated by the vibration sensor and using the amplified signal to amplitude modulate a carrier signal at a frequency in excess of one kilohertz and applying the amplitude modulated carrier signal to the sensor interface circuit.

Preferably, the final signal processing is done by a microprocessor and the vibration is displayed as a dimensionless numeric value representing the average level of vibration According to a preferred embodiment, the amplitude modulation circuit used for waveform conversion is an analog switch controlled by a square wave derived from a crystal oscillator.

BRIEF DESCRIPTION OF THE DRAWING

The drawing is a circuit diagram of a system according to one embodiment of this invention.

DESCRIPTION OF THE PREFERRED EMBODIMENTS

Figure 1:
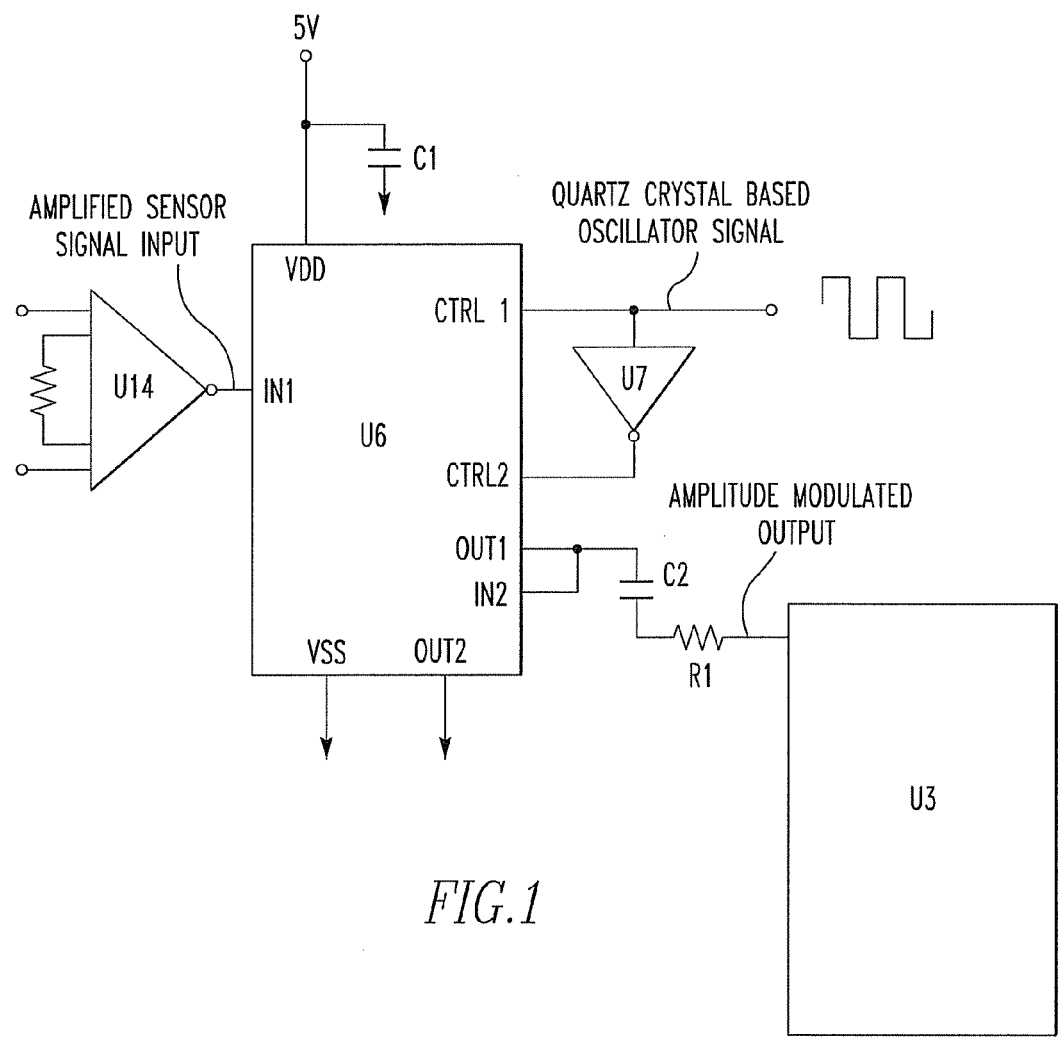

The automotive detonation sensor is in fact a piezoelectric accelerometer optimized for sensing engine knock in the frequency range of 2,000 to 20,000 hertz. In addition to these sensors, there have been a number of dedicated signal-processing integrated circuits designed specifically for use with these sensors in the automotive applications. Since the application of interest for these components is normally limited to the frequency range of 1,000 to 20,000 hertz, the proper operation of them is not currently possible at the frequency of typical mechanical vibrations which oscillate in the range of 1 to 1,000 hertz.

This invention allows for the sensing and processing of these low frequency mechanical vibrations with the same basic low cost parts that are typically used for detonation sensing. The detonation sensors and electronics will not normally sense such low frequency signals. This is accomplished by pre-amplifying the sensor signal prior to transmission and then transmitting it to the highly integrated signal-processing chip using a fixed carrier frequency and an innovative form of amplitude modulation.

The piezoelectric accelerometers (knock sensors) developed for the automotive industry specifically for detonation sensing are optimized for direct mounting in extreme environments. Since these sensors are typically mounted under the hood on the engine of an automobile, they are made to be resistant to moisture, corrosion, heat, and shock. Also because these sensors are designed to be serviced by busy automotive mechanics the mounting has been simplified to use a single large bolt through the center of the device. These robust physical characteristics make the use of these devices on industrial equipment highly attractive. Exemplary of these sensors is one manufactured by Robert Bosch, Model 0 261 231 148. However, due to the large difference in the frequency range of the signals being sensed for mechanical vibration versus those typical of engine knock, the use of these sensors for general industrial applications has not previously been possible.

Piezoelectric vibration sensors have a mass that on account of its inertia exerts compressive forces on a piezoelectric element when accelerated. These forces result in charge transfer within the element generating a voltage between top and bottom. This voltage is picked off and made available as a measuring signal. The measurement of sensitivity of the sensors is defined as output voltage per unit of acceleration due to gravity.

Like most vibration sensing devices, the output voltage characteristic of these sensors is identified over a specific frequency range, i.e., 1 to 20 kilohertz. The output voltage of the automotive knock sensor is greatly reduced at other frequencies outside this specific range, however it is not zero. Moreover, the dedicated signal-processing integrated circuits (knock sensor interface chips) specifically developed for a low cost interface to these sensors pass the input through an analog bandpass filter and thus are only capable of handling signals within the frequency range normally found for detonation of an automotive engine and produce virtually no output signal for very low frequency vibrations, even after amplification.

While not normally done, it is possible to amplify the low frequency output of the piezoelectric accelerometers to correct for the very low amplitude of these signals at the lower frequencies by using a high impedance input amplifier with a gain larger than unity. This approach would potentially allow for the use of the detonation sensors to monitor lower frequency mechanical vibrations except that the signal-processing integrated circuits tend to exclude these signals with the bandpass filter. An exemplary amplifier for amplifying the output of the vibration sensor is INA118 available from various manufacturers.

Available knock sensor interface chips have multiple functions on a single chip including an analog filter receiving the input signal, an analog-to-digital converter, a digital programmable gain function, a digital programmable bandpass function, a rectifier, a programmable integrator, and a serial data input and output enabling communication with a microprocessor. The main functions are provided by an internal digital signal processor. An exemplary knock sensor interface chip is one available from Texas Instruments as Model TPIC8101.

While it would be possible to create a new independent circuit design which replicates the function of the dedicated detonation-processing (knock sensor interface) chips, the circuit would be both complex and costly and would not benefit from the extensive development effort already applied to the current chip design by the automotive industry. For example, the digital bandpassing filter function within these integrated circuits is purely a digital implementation, so that no supply voltage sensitivity or temperature drift occurs within the chip and the integration of the captured signal is done using a full wave rectifier digital implementation which has no diode voltage dropping offsets. In addition, the output signals from these chips can be amplified or attenuated by merely sending a serial message to the processing chip and the output value can be read directly by a microprocessor via this same serial link eliminating the need for use of a separate A/D converter function. Finally, an on chip signal-integrating function with selectable integrating rates can also be selected. All of these factors combined make the use of the integrated circuits designed for detonation signal processing extremely desirable versus the use of any independently developed processing circuitry.

Since the detonation-processing chips, such as the Texas Instruments TPIC 8101 and other equivalent products, cannot function properly at a signal frequency below several thousand hertz, they have previously not been applied to general vibration sensing applications where the signal being measured is often 100 hertz or less.

In order to make the use of the TPIC 8101 or equivalent integrated circuit products possible, an innovative form of amplitude modulation circuitry was developed. The concept of AM processing is well known for higher frequency applications (radio frequency), but is not normally used with signals nearly as low in frequency as vibration signals. One of the aspects of using an amplitude modulated approach to convert the signal to a usable signal for the TPIC 8101 is that traditional analog processing would require the selection and matching of bandpass capacitors which are of such a large capacitance value and high accuracy that it would be impractical to do so.

Referring to the drawing, as the low frequency signal leaves the pre-amplifier U14, it enters one side of an analog switch which can be opened and closed by the digital signal on the control input pin. According to one embodiment to this invention, a quartz crystal-based oscillator and the simple low cost analog switch U6 are used to create a digitally controlled amplitude modulated waveform. The analog switch has the characteristic behavior of a contact-type switch implemented in solid state electronics whereby it connects its input and output pins through a low impedance connection when in the "ON" state. When the control input is at zero, the analog switch is in the "OFF" state, the switch is open and no signal is sent. Since the control input is switching at the frequency determined by the crystal oscillator and microprocessor, the resulting output has a carrier frequency equal to that particular frequency. Also since the frequency is based on the output of a quartz crystal oscillator, there is no significant change in the frequency versus environmental conditions, such as temperature or supply voltage. Ideally, the carrier frequency is selected to be well within the range of the TPIC 8101 operating bandwidth. An exemplary analog switch is available from various manufacturers under the model designation MC14066B.

By using a square wave with a 50% duty cycle to switch the analog switch package "ON" and "OFF," the resulting amplitude modulated waveform has a well-defined relationship to the original signal. While any number of circuits could be created to convert the amplitude modulated vibration waveform to some sort of a useable form, this approach has a number of distinct advantages. Since the integral of the processed AM signal is exactly half the value of the integral of the original input signal multiplied by the gain, it is fairly simple to make basic measurement conversions and rationalizations about the measured values.

The amplitude modulated signal is applied to the knock sensor chip U3 and passes the analog bandpass filter for processing by the analog-to-digital converter and digital signal processor. Once a relative value for the measured level of vibration has been established, it can be arbitrarily scaled as a dimensionless number or figure of merit. By characterizing the vibration magnitude as a simple numeric value, it can be easily compared to preset values for alarms or shutdown of the equipment within the microprocessor unit. The microprocessor allows for intelligent messages to be displayed either locally or remotely so that operating personnel are fully advised of the vibration levels currently present on the machine.

Having thus defined our invention with the detail and particularity required by the Patent Laws, what is desired protected by Letters Patent is set forth in the following claims.

The invention claimed is:

1. A system comprising a vibration sensor and sensor interface previously developed for sensing detonations at frequencies greater than one kilohertz on automobile engines for the measurement of mechanical vibration of a much lower frequency on industrial equipment, further comprising an amplifier for amplifying signals of frequencies less than one kilohertz generated by the vibration sensor and an amplitude modulation circuit that uses the amplified signals to amplitude modulate a square wave carrier signal having a predetermined duty cycle at a frequency in excess of one kilohertz and applying the amplitude modulated square wave carrier signal to the vibration sensor and sensor interface circuit, wherein said vibration sensor and sensor interface uses an integrator to process the amplitude modulated square wave carrier signal to determine a value for the measured level of the vibration.

2. A system according to claim 1, where the system comprises a microprocessor that is connected to the vibration sensor and sensor interface and said microprocessor is programmed to perform the final signal processing to determine a dimensionless numeric value representing the average level of vibration.

3. A system according to claim 2, wherein the amplitude modulation circuit used for waveform conversion is an analog switch controlled by a square wave derived from a crystal oscillator.

* * * * *